Figure 1:
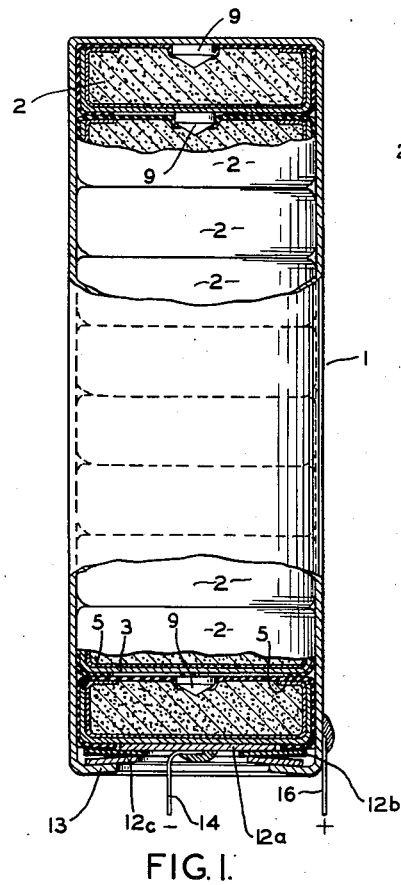

Jan. 12, 1943.　　C. P. DEIBEL ET AL　　2,307,764

DRY CELL BATTERY

Filed Aug. 15, 1941

INVENTORS.
CYRIL P. DEIBEL.
and LEWIS A. GRAY
BY Fay, Macklin, Golrick,
Williams, Chilton and Isler.
ATTORNEYS Patented Jan. 12, 1943

2,307,764

UNITED STATES PATENT OFFICE 2,307,764

DRY CELL BATTERY

Cyril P. Deibel and Lewis A. Gray, Lakewood, Ohio; said Gray assignor to said Deibel Application August 15, 1941, Serial No. 407,014

10 Claims. (Cl. 136—111)

This invention relates to batteries generally referred to as dry cell batteries and more particularly to a battery of the so-called wafer or layer built type.

This application is a continuation in part of our application Serial No. 327,652, filed April 30, 1940, for Dry cell battery unit.

One of the objects of the invention is to provide a dry battery of the character described which is extremely light in weight and small in size for a given energy output and a battery which is especially adapted for use where space and weight are an important factor, as for instance when installed in hearing aids, portable radios, portable batteries and the like.

Another object of the invention is to provide a layer built type battery having any desired number of cells, the novel construction of which obviates the necessity for the customary wax seal heretofore used, by utilizing thin rubber or latex coverings or jackets which substantially enclose each cell in a manner to be presently described.

Our improved construction and method of assembly is equally well adapted for use with dry cells of all sizes and shapes, for instance, round, square, oblong, etc. Each cell is capable of producing 1½ volts so that when a plurality of such cells are stacked in series, the voltage output is 1½ volts times the number of cells.

A further object of the invention is to provide a layer built type battery the construction of which will readily permit the use of any number of cells of such size as to obtain any desired voltage and electrical output and which may be easily and quickly assembled and which practically eliminates the possibility of electrolytic leakage, which is an important requisite in batteries employed for hearing aids which are worn upon the person.

Another object of the invention is to provide a layer built type of battery of any required voltage or capacity which requires no application of heated sealing materials which are deleterious to the battery and in which the cells are held in intimate electrical contact without the use of soldered metallic connectors the application of which also requires excessive heat which may injure the battery.

Another important object of the invention is to provide a layer built battery which is simply sealed in a fashion which prevents the access of outside air and at the same time permits the venting of generated gases within the battery through the rubber jacket thereby assuring a long shelf life.

Another object of the invention is to provide a battery of the character described having means associated therewith for insuring good electrical contact between the carbon electrode and the zinc electrode of adjacent cells, such means including a carbon button having a recess therein which receives a spring-like conductor which is slightly deflected in the assembly of the cells so as to engage the adjacent zinc electrode.

Another important object of the invention is to provide a battery which consists mainly of active current generating materials and which is simple in its construction and therefore well adapted for automatic production methods, and which is relatively light in weight, inexpensive to manufacture and which will have a long shelf life.

With the above, and other objects in view, which will become apparent from the following description, the invention consists in the novel construction, combination, location and arrangement of parts as will hereinafter be more fully set forth in detail.

Figure 2:
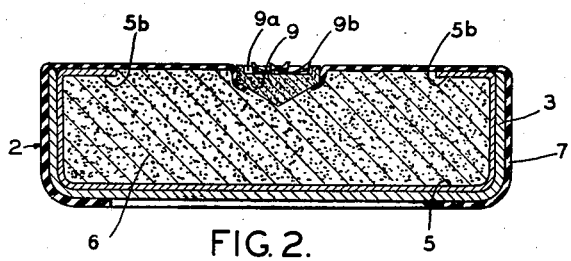
Figure 3:
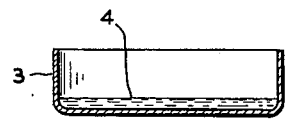
Figure 4:
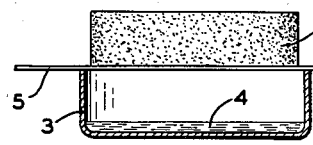
Figure 5:
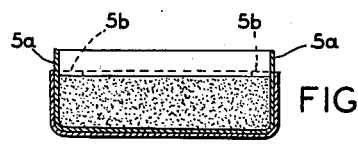
Figure 6:
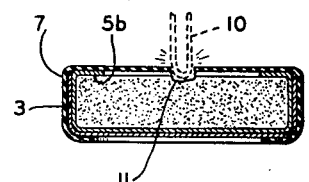
Figure 7:
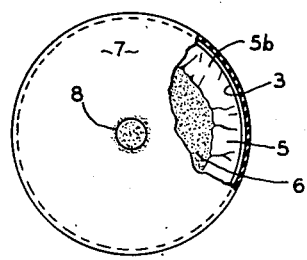
Figure 10:
Figure 8:
Figure 9:
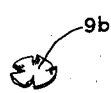

In the accompanying drawing wherein we have shown one embodiment of our invention but without intent to limit ourselves thereto, Fig. 1 illustrates a layer built type battery made in accordance with our invention, certain parts appearing in central vertical section and other parts in elevation, with the container partially broken away; Fig. 2 is a central vertical section of one of the cells shown in Fig. 1 but on a greatly enlarged scale; Figs. 3 to 6 illustrate one method which may be successfully employed for forming the cells; Fig. 3 is a sectional view of one of the zinc cups; Fig. 4 a sectional view of the paper insulator and molded cake of depolarizing mix in position to be inserted within the cup; Fig. 5 a sectional view of one of the cells after the insulator and mix have been inserted therein; Fig. 6 a sectional view showing the rubber or latex jacket applied and one method of providing a centrally disposed hole in the jacket and mix for the reception of the carbon button shown in Figs. 1 and 2; Fig. 7 is a plan view of the cell shown in Fig. 6 with a portion of the jacket broken away to expose the folded part of the paper insulator and a portion of the cake of depolarizing mix; Fig. 8 is a perspective view of one of the carbon buttons; Fig. 9 is a perspective view of one of the resilient spring-like contact members which engages in the recess provided in the top of the carbon button; and Fig. 10 is a sectional view of a metal washer or insert which is disposed within the cell and which serves to maintain resilient contact between the several cells and the outer metal casing.

Referring now to the drawing, a wafer or layer built battery embodying the principle of the present invention is illustrated in Fig. 1 and comprises a metal container 1 which is preferably an extruded zinc can of any suitable shape (here shown as circular in cross section) and in which is arranged a plurality of dry cells, indicated generally by the reference numeral 2. Each of the several cells is electrically insulated from the container 1 in a manner to be presently described. For purposes of illustration, and as shown in Fig. 1, ten dry cells designated by the reference numeral 2 are stacked within the container 1 in a carbon to zinc relation and are thus connected in series within the can or container 1. Each cell 2 has an output of 1½ volts and the battery illustrated will, therefore, have an output of 15 volts. It is to be noted, however, that any number of these cells 2 of any size may be used depending upon the desired voltage and electrical output. Before describing the method of securing the cells 2 within the container 1 to insure intimate contact between the several cells, it is deemed advisable to describe the novel construction of the cells, and as all of the cells are identical in structure, a description of one will suffice for all.

Referring now to Figs. 3-6 inclusive, which graphically illustrate one method which may be used for fabricating the cells 2, a shallow container, preferably a drawn zinc cup 3, having one end open is first preferably supplied with a small quantity of battery electrolyte, such as a zinc chloride and ammonium chloride solution 4. After the cup 3 has been partially filled with such solution, a sheet or disk of suitable insulating material 5 is then placed over the open end of said zinc cup 3, as shown in Fig. 4, and a molded cake of depolarizing mix 6 is then placed upon the paper insulator 5 and pressed into the cup 3 under considerable pressure. The paper insulating sheet 5 is disposed between the mass of mix 6 and the cup 3, as shown in Fig. 5, and the projecting portion 5ᵃ of the insulator 5 is then folded down upon the mass of mix 6, as shown at 5ᵇ in Figs. 5 and 7. The battery electrolyte 4 will be absorbed by and pass through the paper insulator 5 into contact with the molded cake of depolarizing mix 6 in the usual and well known manner.

As the next step (illustrated in Fig. 6), a very thin distensible rubber or latex jacket 7 is drawn over the cup 3 in a manner to close the open end of such cup and to tightly engage its side walls and a portion of its bottom. This latex or rubber jacket serves a two fold purpose in that it prevents escape of substantially all moisture and allows excessive gas pressure to be relieved and at the same time insulates the cell from the container 1. After the elastic jacket 7 is drawn over the cup 3 to close its open end, in the manner just described, a centrally disposed hole 8 is then made in the jacket to receive a slightly tapered carbon button 9, shown in Fig. 2. It is desirable to form the hole 8 into the jacket 7 after the latter has been drawn over the cup or can 3 in order to insure that it is centrally disposed with respect to the cup 3. This hole may be formed in the jacket 7 in any convenient manner, one successful method being to apply a heated element 10 to the cell as shown in Fig. 6 thereby burning a hole in the jacket 7 and at the same time forming a depression 11 in the mix 6 to receive one end of the carbon button 9.

The carbon button 9 is disclosed in detail in Fig. 8 and is slightly tapered as shown, and has a recess 9ᵃ in the upper end thereof which receives therein the resilient contact member 9ᵇ which is shown in detail in Fig. 9. This resilient contact member is preferably formed of Phosphor bronze and has oppositely disposed portions thereof deflected upwardly as will appear from Figs. 2 and 9. Immediately after the hole is burned in the insulating jacket, the carbon button is forced thereinto under pressure, the heated rubber covering being somewhat tacky adjacent the opening so that the jacket adheres to the carbon button and forms a liquid-tight seal therewith. A plurality of such cells are arranged within the container 1 in stacked relation as shown in Fig. 1, with the carbon button of the innermost cell having electrical contact with the inner bottom wall of the container. After the desired number of cells have been inserted within the container in the carbon to zinc relation illustrated, a metal disk 12ᵃ is placed over the bottom of the outermost zinc cup. An insulating ring 12ᵇ formed of fish paper or the like is next inserted. In order to insure a better contact between the electrode and adjacent cells a slightly dished metal ring 12ᶜ is inserted. The insulating ring 12ᵇ serves to insulate the metal ring from the terne plate disk 12ᵃ. With the cells in this condition, sufficient pressure is applied to the outermost cell to insure good electrical contact between the adjacent electrodes and while the cells are held in this compressed position within the container, the open end of the container is spun over inwardly as indicated at 13, thereby to retain the cells within the container in intimate contact with each other and under considerable pressure. A negative lead or terminal 14 is soldered to the terne plate disk 12ᵃ and a positive terminal 16 is soldered to the outer side of the zinc can. A plurality of such assemblies of battery units may be connected in series or in parallel, as desired.

It will be readily understood from the foregoing description that each of the cells 2 is insulated from the container 1 and that due to the pressure exerted upon the cells before the open upper end of the container is spun over, this intimate contact will be maintained throughout the life of the battery. Each cell as well as the entire battery is substantially leak proof and any excessive generated gas pressure may escape through the pores in the rubber jackets. Such a battery has an exceptionally long shelf life as well as a long active life and is well adapted for quantity production at low cost.

It will now be clear that we have provided a battery which will accomplish the objects of the invention as hereinbefore stated. Various changes may be made in the details of construction and arrangement of parts, as well as in the materials used, without departing from the spirit of our invention. The embodiment of the invention herein disclosed is therefore to be considered merely as illustrative and not in a limiting sense, as the invention is limited only in accordance with the scope of the appended claims.

Having thus described our invention, what we claim is:

1. A dry cell battery unit comprising an outer container, a plurality of cells arranged within said container and held in intimate contact with each other, each cell being insulated from said container, a part of said outer container being bent over inwardly so as to hold the electrodes of adjacent cells in intimate contact with each other and comprising a metal shell in which is arranged a mass of mix and a carbon electrode, an insulating jacket surrounding each cell and separately insulating it from said container, the carbon electrode contacting the mix of one cell and the metal shell of the next adjacent cell and having liquid tight engagement with said insulating jacket.

2. A dry cell battery unit comprising an outer metal casing, a plurality of small wafer-like dry cells arranged within said casing, a rubber jacket enclosing each cell, each cell comprising a zinc cup containing a mass of mix and a carbon electrode which is held in intimate contact with the mass of mix and which has an unexposed surface having liquid-tight engagement with said jacket and an exposed surface disposed exteriorly of said jacket, the carbon electrode of the innermost cell having intimate contact with said metal casing, a terminal connected with the outermost zinc cup and a terminal leading from said outer casing, the outer end of said casing being bent over inwardly and holding all of said cells under pressure.

3. A dry cell battery unit comprising an outer metal casing, a plurality of small wafer-like dry cells arranged within said casing, a rubber jacket enclosing each cell, each cell comprising a zinc cup containing a mass of mix and a carbon electrode which is held in intimate contact with the mass of mix and which has an unexposed surface having liquid tight engagement with said jacket and an exposed surface disposed exteriorly of said jacket, the carbon electrode of the innermost cell having intimate contact with said metal casing, a terminal connected with the outermost zinc cup and a terminal leading from said outer casing, and means for holding all of said cells under pressure.

4. A dry cell battery unit comprising an outer casing, a plurality of small wafer-like dry cells arranged within said casing, a thin distensible insulating jacket surrounding each cell and closely adhering thereto and formed of a material which will permit excessive pressure within the cell to be relieved therethrough without permitting the liquid contents of the cell to escape, each cell comprising a zinc electrode, a mass of depolarizing mix containing an electrolyte and a carbon electrode which is held in intimate contact with said mass of mix and which has an unexposed surface having liquid tight sealed engagement with said insulating jacket and an exposed surface disposed exteriorly of said jacket and having intimate contact with the zinc electrode of the next adjacent cell, a positive and a negative terminal for said battery unit, and means for holding all of said cells in intimate contact with each other under pressure.

5. A dry cell battery unit comprising an outer container, a plurality of dry cells arranged within said container and having electrical contact with each other, an insulating jacket enclosing each cell, each cell including a carbon electrode disposed partially interior and partially exterior of said insulating jacket and having liquid-tight sealed engagement therewith, each carbon electrode having a recess in the outer end thereof and receiving therein a resilient electrical contact member which engages the negative electrode of an adjacent cell.

6. A dry cell battery unit comprising an outer metal casing, a plurality of small wafer-like dry cells arranged within said casing, a rubber jacket enclosing each cell, each cell comprising a zinc cup containing a mass of mix and a carbon electrode, each carbon electrode being embedded in the mass of mix and having a recessed upper end receiving therein a spring-like electrical contact member which engages the next adjacent zinc cup, each carbon electrode having liquid-tight engagement with said jacket, the carbon electrode of the innermost cell having electrical contact with the metal casing and the remaining cells being insulated from the metal casing, a terminal connected with the outermost zinc cup and a terminal leading from said outer casing, and means holding all of said cells within said outer container and in intimate contact with each other under pressure.

7. A dry cell battery unit comprising an outer metal casing, a plurality of small wafer-like dry cells arranged within said casing, a rubber jacket enclosing each cell, each cell comprising a zinc electrode containing a mass of mix and a carbon electrode embedded in the mass of mix and having liquid-tight sealed engagement with said jacket, said carbon electrode having a recess in the upper end thereof and receiving therein a resilient electrical contact member which engages the zinc electrode of an adjacent cell, a terminal connected with the outermost zinc electrode and a terminal leading from said outer casing, and means holding all of said cells within said outer casing under pressure.

8. A dry cell battery unit comprising an outer casing, a plurality of small wafer-like dry cells arranged within said casing, a thin distensible insulating jacket surrounding each cell and closely adhering thereto and formed of a material which will permit excessive pressure to be relieved therethrough without permitting the liquid contents of the cell to escape, each cell comprising a zinc electrode, a mass of depolarizing mix containing an electrolyte and a carbon electrode which is held in intimate contact with said mass of mix and which has liquid-tight sealed engagement with the adjacent insulating jacket, said carbon electrode heaving a recess in the outer end thereof and receiving therein a resilient electrical contact member which engages the zinc electrode of the next adjacent cell, and means holding all of said cells within said outer casing under pressure.

9. A dry cell battery unit comprising an outer casing, a plurality of small wafer-like dry cells arranged within said casing, a thin distensible insulating jacket surrounding each cell and closely adhering thereto and formed of a material which will permit excessive pressure to be relieved therethrough without permitting the liquid contents of the cell to escape, each cell including a zinc electrode, a mass of depolarizing mix and a carbon electrode which is held in intimate contact with said mass of mix and which has liquid-tight sealed engagement with the adjacent insulating jacket, a spring-like conductor disposed between the carbon electrode and the zinc electrode of each cell and serving to provide good electrical contact therebetween, and means holding all of said cells within said outer casing under pressure.

10. A dry cell battery unit comprising an outer casing, a plurality of small wafer-like dry cells arranged within said casing, a distensible insulating jacket enclosing each cell and formed of a material which will permit excessive pressure within the cell to be relieved without permitting the escape of the liquid contents of the cell therethrough, each cell comprising a zinc cup containing a mass of mix and a carbon electrode which is held in intimate contact with the mass of mix and which has an unexposed surface having liquid tight engagement with said insulating jacket and an exposed surface disposed exteriorly of said jacket, the carbon electrode of the innermost cell having intimate contact with said metal casing, a terminal connected with the outermost zinc cup and a terminal leading from said outer casing, a spring-like conductor disposed between the carbon electrode and the zinc electrode of adjacent cells and providing good electrical contact therebetween, and means for holding all of said cells within said outer casing under pressure.

CYRIL P. DEIBEL.
LEWIS A. GRAY.